US012104589B2

(12) United States Patent
Zillinger (10) Patent No.: US 12,104,589 B2
(45) Date of Patent: Oct. 1, 2024

(54) INTEGRATED ELECTRICALLY SUBMERSIBLE PUMP SENSOR DEVICE (71) Applicant: Geo Pressure Systems Inc., Calgary (CA)

(72) Inventor: Friedrich Ernst Zillinger, Armstrong (CA)

(73) Assignee: GEO PRESSURE SYSTEMS INC. (CA)

( * ) Notice: Subject to any disclaimer, the term of this patent is extended or adjusted under 35 U.S.C. 154(b) by 378 days.

(21) Appl. No.: 17/545,951

(22) Filed: Dec. 8, 2021

(65) Prior Publication Data

US 2023/0175501 A1 Jun. 8, 2023

(51) Int. Cl.
*F04B 51/00* (2006.01)
*E21B 43/12* (2006.01)
*F04B 17/03* (2006.01)
*G01K 13/00* (2021.01)
*G01L 19/00* (2006.01)
*H01B 17/20* (2006.01)
*H01B 17/26* (2006.01)

(52) U.S. Cl.
CPC ............ *F04B 51/00* (2013.01); *E21B 43/128* (2013.01); *F04B 17/03* (2013.01); *G01K 13/00* (2013.01); *G01L 19/0007* (2013.01); *H01B 17/20* (2013.01); *H01B 17/26* (2013.01)

(58) Field of Classification Search
CPC ........ F04B 51/00; F04B 17/03; E21B 43/128; G01L 13/00; G01L 19/0007
See application file for complete search history.

(56) References Cited

U.S. PATENT DOCUMENTS

| | | | | |
|---|---|---|---|---|
| 4,624,136 A | * | 11/1986 | Delatorre | E21B 41/0085 73/152.54 |
| 2005/0109515 A1 | * | 5/2005 | Watson | E21B 43/128 166/65.1 |
| 2014/0099217 A1 | * | 4/2014 | McCormick | H02K 5/08 29/825 |

OTHER PUBLICATIONS

"ACE Downhole, ESP Downhole Sensor System Installation, Configuration and Operation Manual, 2020,-,-,all" (Year: 2020).*

* cited by examiner

*Primary Examiner* — Connor J Tremarche
(74) *Attorney, Agent, or Firm* — Kirsten M. Oates; Rodman & Rodman LLP (57) ABSTRACT

A device for monitoring an electrical submersible pump having a motor includes an integrated temperature sensor and electrical feedthrough assembly having a probe body housing the temperature sensor, the electrical feedthrough assembly, and a high voltage insulator; an electronics assembly operably connected to the integrated temperature sensor and the electrical feedthrough assembly; and a pressure assembly operably connected to the electronics assembly.

20 Claims, 12 Drawing Sheets

INTEGRATED ELECTRICALLY SUBMERSIBLE PUMP SENSOR DEVICE

FIELD OF THE INVENTION

The present invention relates generally to downhole equipment for use in wells, and more particularly to an improved compact integrated electric submersible pump ("ESP") sensor device for use in monitoring the health of an ESP system.

BACKGROUND OF THE INVENTION

Artificial lift devices are used to facilitate extraction of downhole fluids such as hydrocarbons, water, or other fluids. One such device is an electrical submersible pump ("ESP") which has an electric motor powered by a power supply and pumps fluids from the reservoir to the surface via tubing installed in the wellbore. The motor is located downhole from the pump so that well fluids pass over the motor to help keep the motor cool.

ESP sensors may be physically connected to the top, bottom, or side of the pump by connection to the motor having one or more wires. Motors may be single phase or DC, 2-phase, or 3-phase having one, two, or three wires, respectively. As an example, the ESP sensor may be electrically connected to a 3-phase motor's electrical y-point where three phase wires come together. ESP sensors may measure various parameters to provide the operator and automated control systems with real-time information about the performance of the motor, pump, and the downhole environment.

Motor temperature is commonly determined using an ESP sensor which measures either the motor oil temperature or the motor windings temperature. The motor oil temperature is typically measured in the oil near where the ESP sensor is connected. The motor oil temperature sensor can be in a metal sheath or have exposed wires. A manufacturer may also build the motor with the temperature sensor embedded in the windings. In some prior art configurations, the ESP sensor may be manufactured to include a temperature probe and one or more pins for connection to the motor y-point, with the temperature probe and one or more pins being separate and positioned apart. However, such ESP sensors require multiple probes, pins, and other attachment means, rendering them inconveniently large and relatively costly and complex to manufacture.

SUMMARY OF THE INVENTION

The present invention relates to an improved compact integrated ESP sensor device for use in monitoring the health of an ESP system.

In one aspect, the invention comprises a device for monitoring an electrical submersible pump having a motor comprising:
- an integrated temperature sensor and electrical feedthrough assembly comprising a probe body housing the temperature sensor, the electrical feedthrough assembly, and a high voltage insulator;
- an electronics assembly operably connected to the integrated temperature sensor and the electrical feedthrough assembly; and
- a pressure assembly operably connected to the electronics assembly.

In some embodiments, the device is threadably attached to the motor using a flange adapter, a pipe adapter, or an integral flange connector, or directly to the pump. In some embodiments, the probe body is substantially tubular and comprises a first section and a second section defining a unitary bore extending therethrough, the first section defining an internal seat against which the electrical feedthrough assembly abuts. In some embodiments, the second section comprises first external threads, second external threads, and an external circumferential collar disposed therebetween, the first external threads engaging corresponding internal threads of the flange adapter.

In some embodiments, the temperature sensor comprises a motor oil temperature sensor for sensing motor oil temperature of the motor, the motor oil temperature being indicative of motor temperature. In some embodiments, the temperature sensor is selected from a thermocouple, a resistive temperature device, a resonant temperature sensor, or a solid state temperature sensor. In some embodiments, the temperature sensor is positioned proximal to the electrical feedthrough assembly and exterior of the high voltage insulator within the probe body. In some embodiments, the temperature sensor is positioned substantially parallel and above the high voltage insulator within the probe body. In some embodiments, the temperature sensor is electrically connected to the electronics assembly for transmitting an electrical signal representative of the motor oil temperature to the electronics assembly.

In some embodiments, the electrical feedthrough assembly comprises an electrical feedthrough body and an electrical feedthrough pin, the electrical feedthrough body comprising components aligned along an axis to define a unitary passageway for the electrical feedthrough pin to extend therethrough. In some embodiments, the high voltage insulator, the electronics assembly, and the pressure assembly are positioned in alignment with the axis. In some embodiments, the electrical feedthrough pin is configured to receive power from the motor for transmission to the electronics assembly, and to receive electrical signals from the electronics assembly for transmission to surface equipment.

In some embodiments, the high voltage insulator defines a core for enclosing electrical connections between the electrical feedthrough pin and the electronics assembly.

In some embodiments, the pressure assembly comprises a bulkhead housing a pressure sensor for sensing pressure and a pressure port for exposing the pressure sensor to an external pressure source, wherein the pressure sensor generates electrical signals representative of pressure for transmission to the electronics assembly.

In some embodiments, the electronics assembly comprises a housing encapsulating an electronics printed circuit board for receiving and processing the electrical signals from the temperature sensor and the pressure sensor for transmission to surface equipment via the electrical feedthrough assembly. In some embodiments, a first end of the housing defines a first internal circumferential seat for receiving the integrated temperature sensor and electrical feedthrough assembly. In some embodiments, a second end of the housing defines a second internal circumferential seat for receiving the pressure assembly. In some embodiments, the housing encapsulating the electronics printed circuit board is puck-shaped.

In some embodiments, the device further comprises one or more sensors selected from a vibration sensor or a formation pressure sensor.

Additional aspects and advantages of the present invention will be apparent in view of the description, which follows. It should be understood, however, that the detailed description and the specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

The present invention relates to an improved compact integrated ESP sensor device for use in monitoring the health of an ESP system. In one aspect, the invention comprises a device for monitoring an electrical submersible pump having a motor comprising an integrated temperature sensor and electrical feedthrough assembly comprising a probe body housing the temperature sensor, the electrical feedthrough assembly, and a high voltage insulator; an electronics assembly operably connected to the integrated temperature sensor and the electrical feedthrough assembly; and a pressure assembly operably connected to the electronics assembly.

The invention will now be described having reference to the accompanying figures. The device (1) is shown assembled and ready for use in FIGS. 2A-B, 12, and 13A-13B, and unassembled in FIGS. 3A-10A and 11 to show all the components in greater detail. The device (1) generally comprises an assemblage of components comprising an integrated temperature sensor and electrical feedthrough assembly (10), an electronics assembly (12), and a pressure assembly (14) (FIG. 2B).

Figure 2A:
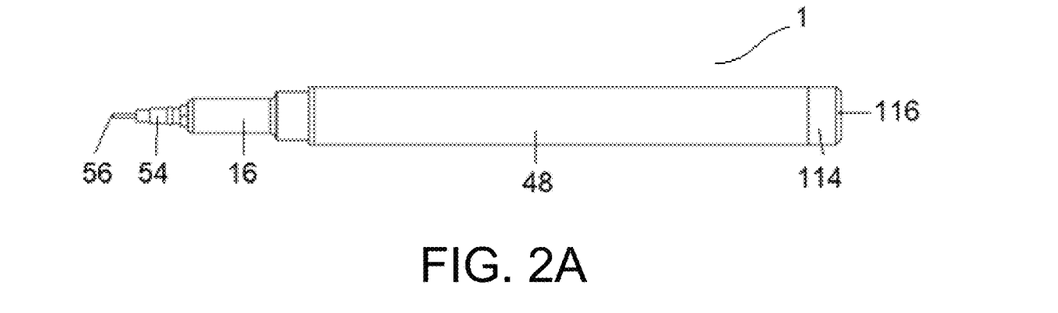
FIG. 2A is a perspective view of one embodiment of an integrated ESP sensor device of the present invention.
Figure 2B:
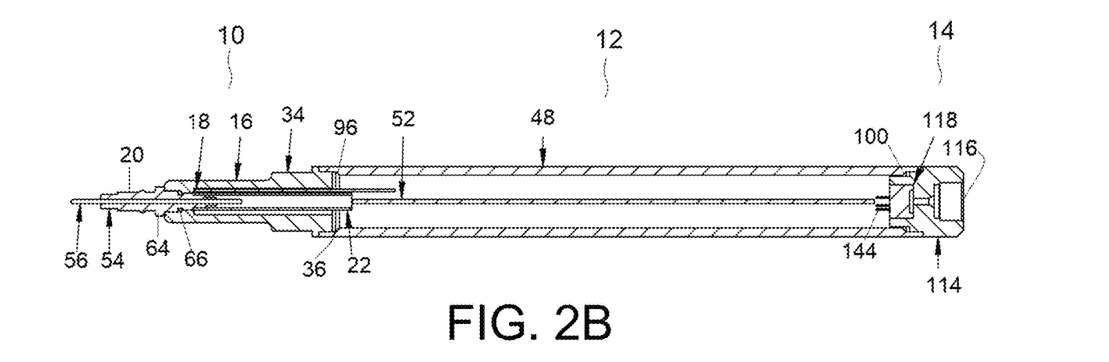
FIG. 2B is a cross-sectional view of the integrated ESP sensor device of FIG. 2A.
Figure 2C:
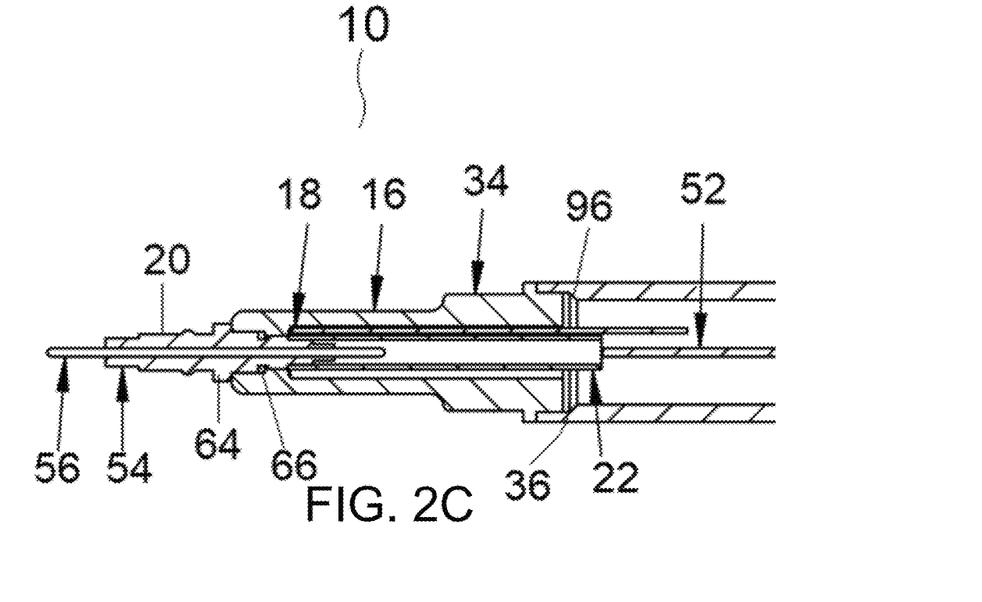
FIG. 2C is an enlarged view of the left portion of FIG. 2B, showing greater detail of an integrated temperature sensor and electrical feedthrough assembly sharing the same probe body.

Referring to FIGS. 2B-C, the integrated temperature sensor and electrical feedthrough assembly (10) generally comprises a probe body (16) configured to house a temperature sensor (18), an electrical feedthrough assembly (20), and a high voltage insulator (22). As used herein, the term "integrated" refers to the temperature sensor (18) and electrical feedthrough assembly (20) being configured or structured to share the same probe body (16). This positioning of the temperature sensor (18) may allow consistent temperature measurements due to consistent sensor location, and avoid problems typically encountered with conventional temperature sensor designs such as, for example, the need to provide seals around the temperature sensor due to exposure to high pressures typically up to 10,000 psi, failure or loosening of connectors to the temperature sensor, damage or failure of external sensor wires, mix-up or improper attachment of connectors and connecting wires, and contact of temperature sensor wires, pins, or sensor with a voltage that could electrically damage internal circuits.

Figure 1A:
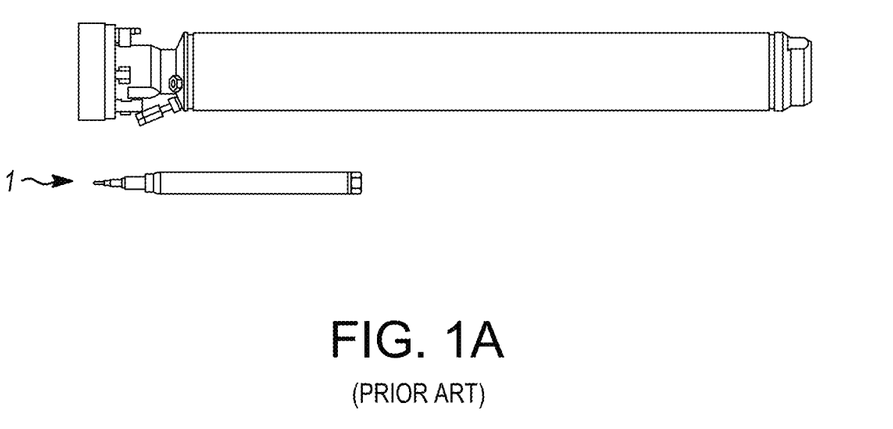
FIG. 1A is a perspective view of one embodiment of an integrated ESP sensor device of the present invention compared to an industry standard ESP sensor (PRIOR ART), showing the size difference.
Figure 1B:
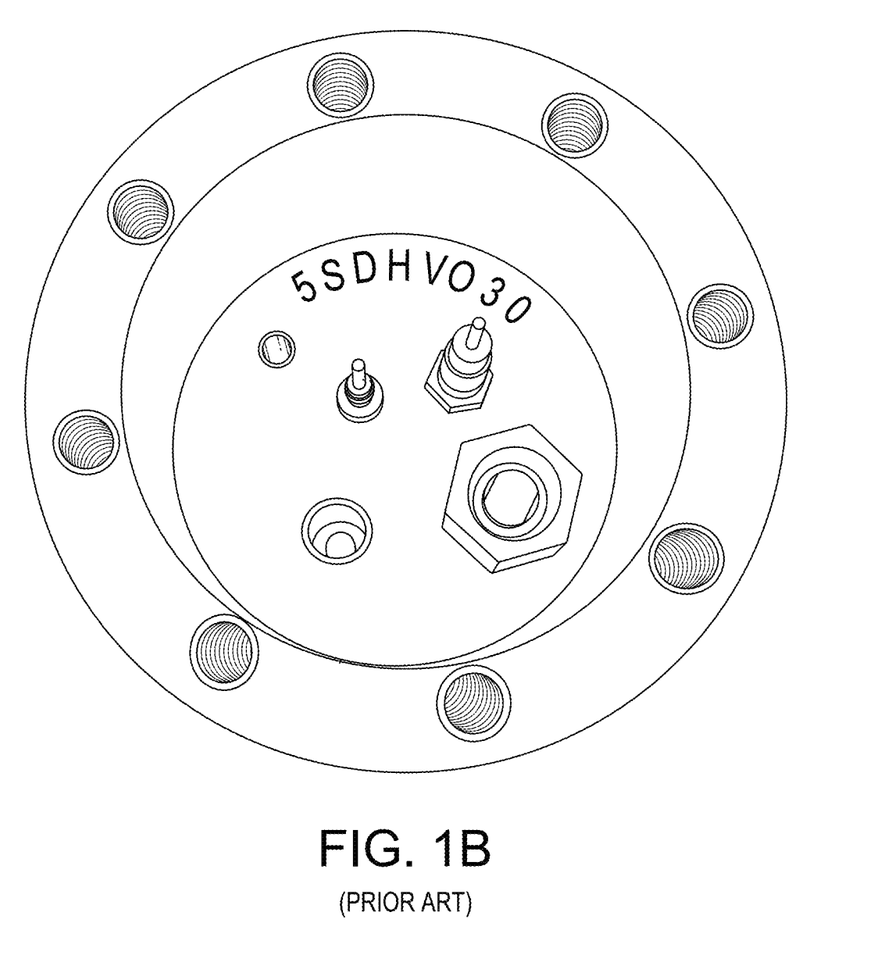
FIG. 1B (PRIOR ART) is a perspective view of an industry standard ESP sensor requiring multiple pins, connections, and attachment means.

The device (1) is thus uniquely compact, smaller and lighter compared to industry standard ESP sensors. The size advantages are driven by no connector or probe for temperature. Provision of a single connector for high voltage allows the device (1) to have a minimal diameter. Without being bound by any theory, smaller diameters can withstand higher pressures with less material. This is critical because the device (1) must withstand very high pressures typically up to 10,000 psi. In addition, the device (1) can be easily shipped to customers in a small box rather than a crate. In some embodiments, the device (1) is 100× smaller and requires fewer pins, connections, and attachment means compared to an industry standard ESP sensor (PRIOR ART), as shown in FIGS. 1A-B. This also translates into minimal manufacturing costs and ease of use (e.g., smaller lightweight size; minimal components; easier to manufacture, transport, ship, install, use; eliminates the need for one or more separate probes, pins, connections, and other parts).

Figure 3A:
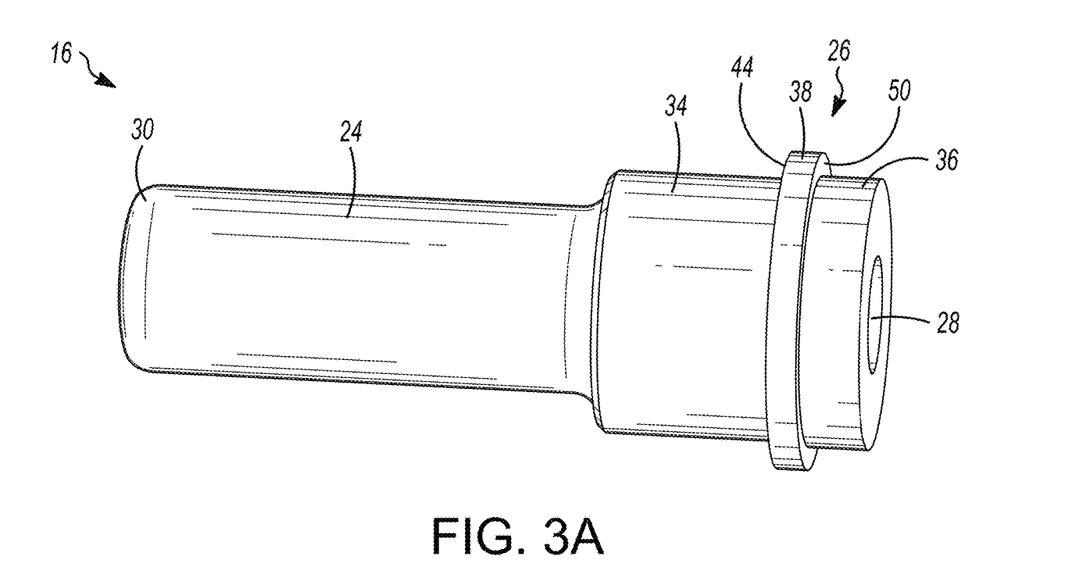
FIG. 3A is a perspective view of one embodiment of a probe body of the integrated ESP sensor device of FIG. 2A.
Figure 3B:
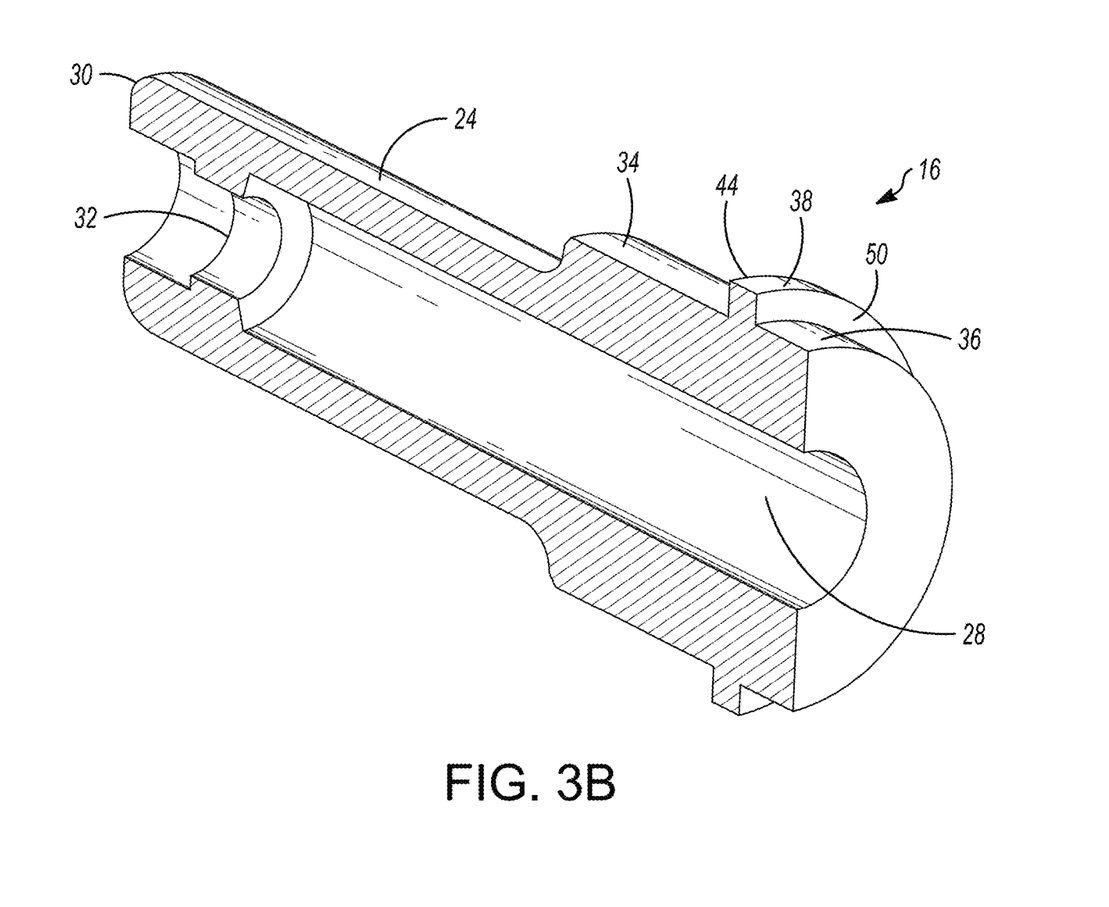
FIG. 3B is a cross-sectional view of the probe body of FIG. 3A.

Referring to FIGS. 3A-B, in some embodiments, the probe body (16) is substantially tubular and comprises a first section (24) and a second section (26). The first and second sections (24, 26) are configured as one piece to together define a unitary bore (28) extending therethrough. In some embodiments, the first section (24) has an external diameter smaller than the external diameter of the second section (26). In some embodiments, the first section (24) is elongated compared to the second section (26). In some embodiments, the first section (24) has a rounded edge (30). In some embodiments, the first section (24) encloses portions of the temperature sensor (18), the high voltage insulator (22), and the electrical feedthrough assembly (20). In some embodiments, the first section (24) includes an internal seat (32) against which the electrical feedthrough assembly (20) abuts when assembled.

In some embodiments, the second section (26) comprises first external threads (34), second external threads (36), and an external circumferential collar (38) disposed therebetween. In some embodiments, the first external threads (34) engage corresponding internal threads (40) of a flange adapter (42) to removably attach the device (1) to the flange adapter (42). In some embodiments, the collar (38) defines a front surface (44) against which the flange adapter (42) abuts when fully threaded. In some embodiments, the second external threads (36) engage corresponding internal threads (46) of a housing (48) to removably attach the probe body (16) to the housing (48). In some embodiments, the collar (38) defines a back surface (50) against which the housing (48) abuts when fully threaded. In some embodiments, welds or adhesives (such as, for example, glue) can be substituted for threads (36). In some embodiments, the second section (26) encloses portions of the temperature sensor (18) and the high voltage insulator (22).

Figure 4:
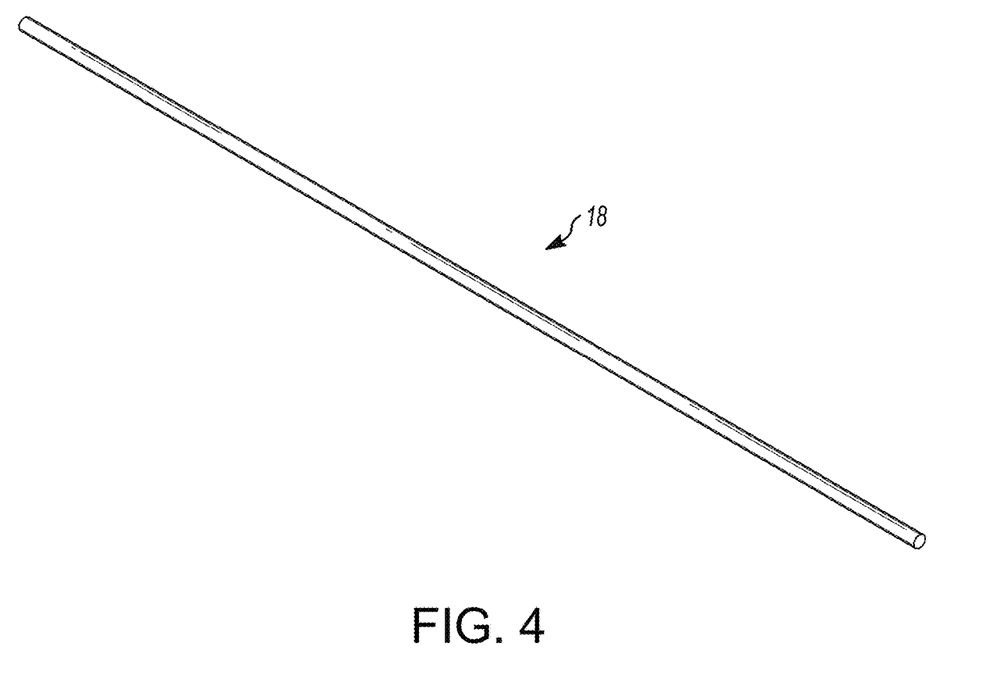
FIG. 4 is a perspective view of one embodiment of a temperature sensor of the integrated ESP sensor device of FIG. 1A.

Referring to FIGS. 2C and 4, in some embodiments, the temperature sensor (18) is positioned proximal to the electrical feedthrough assembly (20) and exterior of the high voltage insulator (22) within the probe body (16). In some embodiments, the temperature sensor (18) is positioned substantially parallel to the high voltage insulator (22) and directly above the top exterior surface of the high voltage insulator (22), as shown in FIG. 2C. In some embodiments, the temperature sensor (18) extends beyond the length of the high voltage insulator (22) into the housing (48) above an electronics printed circuit board ("PCB") (52), as shown in FIG. 2C. The temperature sensor (18) is positioned as closely as possible to the electrical feedthrough assembly (20) to measure the temperature of the motor oil at the bottom of the motor to which the device (1) is attached. Measurement of the motor oil temperature provides a reading of the temperature inside the pump or pump motor. The temperature sensor (18) may be selected from any type of temperature sensing device including, but not limited to, a thermocouple, a resistive temperature device, a resonant temperature sensor, a solid state temperature sensor, and the like. The temperature sensor (18) is electrically connected to the electronics PCB (52) using wires (not shown). The temperature sensor (18) generates an electrical signal representative of the motor oil temperature and transmits the electrical signal to the electronics PCB (52). In some embodiments, the temperature sensor (18) produces an electrical signal in the form of an output voltage or output current.

Figure 5A:
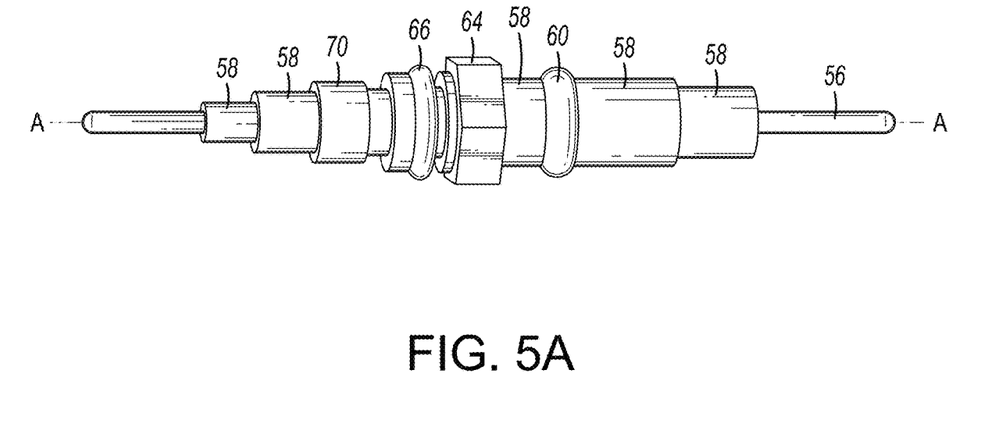
FIG. 5A is a perspective view of one embodiment of an electrical feedthrough assembly of the integrated ESP sensor device of FIG. 2A.
Figure 5B:
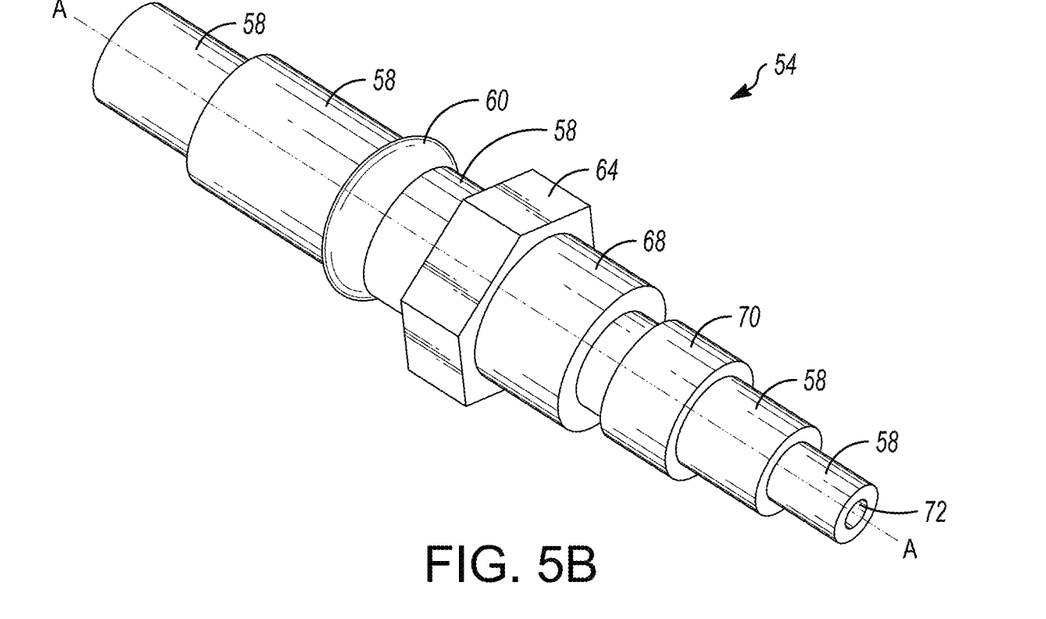
FIG. 5B is a perspective view of one embodiment of an electrical feedthrough body of the electrical feedthrough assembly of FIG. 5A.

Referring to FIGS. 5A-B, in some embodiments, the electrical feedthrough assembly (20) comprises an electrical feedthrough body (54) and an electrical feedthrough pin (56). As used herein, the term "electrical feedthrough" refers to a conductor for carrying electrical signals such as, for example, voltage or current. In some embodiments, a suitable conventional electrical feedthrough body (54) may be used such as that shown for example, in FIGS. 5A-B. The electrical feedthrough body (54) may comprise one or more sections of insulation material (58) including, but not limited to, polyether, polyether ketone plastic (PEEK or PEK), glass sealed with polyether, glass bonded ceramic, and ceramic; a dognot (60); a coupling hex nut (64); an optional O-ring (66); sealing area (68); and threads (70). Such components are assembled as one piece and aligned along axis A-A to together define a unitary passageway (72) for allowing the electrical feedthrough pin (56) to extend therethrough. As shown in FIGS. 2B-C, other components of the device (1) are also assembled in alignment with axis A-A, namely the high voltage insulator (22), electronics PCB (52), pressure sensor (118), pressure port (116), and bulkhead (114).

Figure 5C:
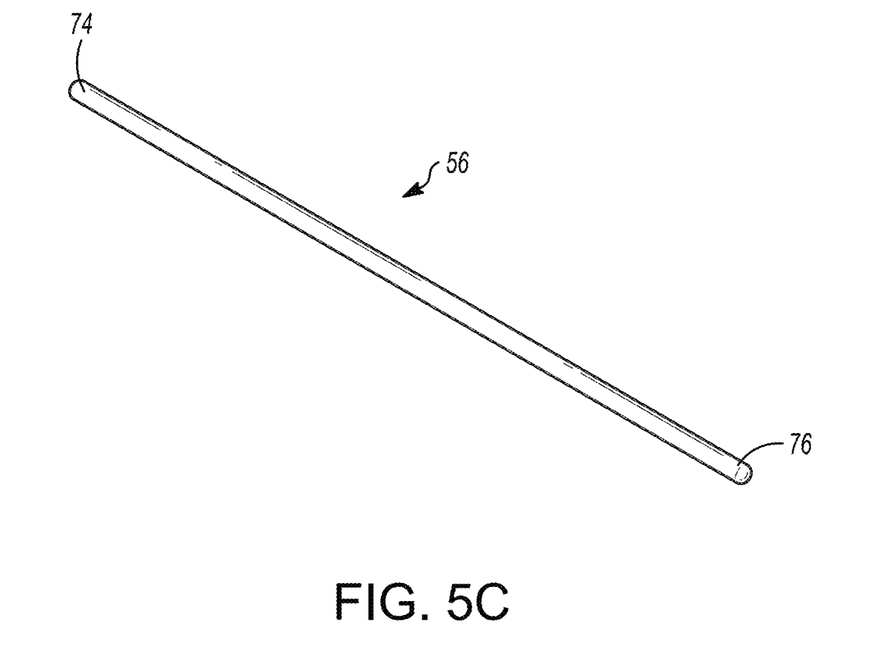
FIG. 5C is a perspective view of one embodiment of an electrical feedthrough pin of the electrical feedthrough assembly of FIG. 5A.
Figure 6:
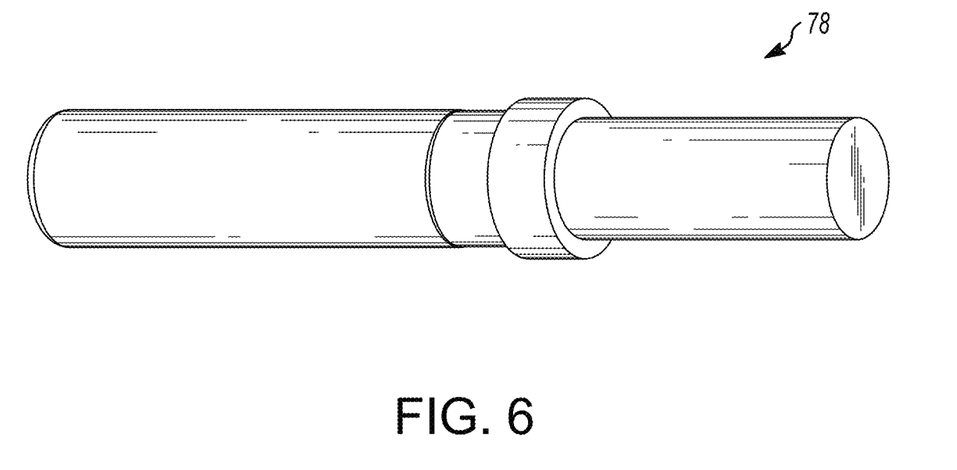
FIG. 6 is a perspective view of one embodiment of a connector socket of the integrated ESP sensor device of FIG. 2A.

Referring to FIG. 5C, the electrical feedthrough pin (56) is substantially elongated and has a proximal end (74) and a distal end (76). The proximal end (74) is connected to a connection of the motor using a conventional connector socket (78) (FIG. 6). As will be recognized by those skilled in the art, a connector socket (78) can be mounted in various ways including, but not limited to, a pigtail, molded y-point adapter, or bulkhead. The motor may be single phase or DC, 2-phase, or 3-phase having one, two, or three wires, respectively, for the connection. In some embodiments, the device (1) connects to a single wire from the motor independent of the configuration of the motor. The connection facilitates delivery of electrical power from the motor to the electrical feedthrough pin (56). The electrical feedthrough pin (56) transmits electrical power to the electronics PCB (52). The distal end (76) of the electrical feedthrough pin (56) is connected to the electronics PCB (52) using suitable connection means including, but not limited to, a wire or other connector (not shown) within the high voltage insulator (22). The electrical feedthrough pin (56) also communicates with surface equipment (such as, for example, a data acquisition, processing, or control system) via the y-point connection of the motor. The electrical feedthrough pin (56) provides a return path for electrical signals from the electronics PCB (52) to the surface equipment.

Referring to FIGS. 2B-C, the electrical feedthrough assembly (20) is mounted within the probe body (16) such that the coupling hex nut (64) abuts the rounded edge (30) of the probe body (16). Components to the left of the coupling hex nut (64) thus extend outwardly from the rounded edge (30) of the probe body (16), while components to the right of the coupling hex nut (64) extend inwardly of the probe body (16), allowing the electrical feedthrough pin (56) to extend within the high voltage insulator (22). The electrical feedthrough body (54) is sealed against the probe body (16) using one or more sealing elements including, but not limited to, O-rings, threads, welds, adhesives such as glue and the like.

Figure 7:
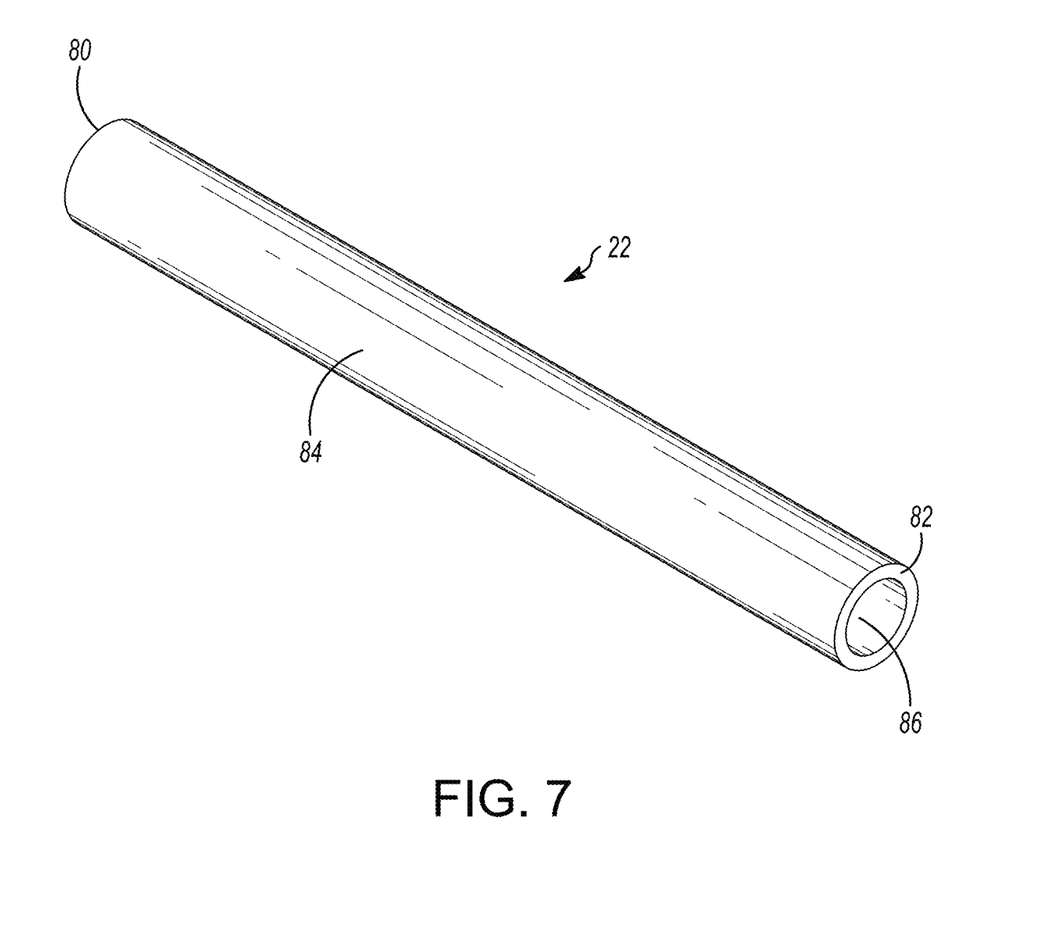
FIG. 7 is a perspective view of one embodiment of a high voltage insulator of the integrated ESP sensor device of FIG. 2A.

As used herein, the term "high voltage" refers to voltages typically, but not limited to, 440 V to 5,000 V. In some embodiments, the average operating voltage is about 2,500 V. Referring to FIG. 7, the high voltage insulator (22) comprises a first end (80), a second end (82), and a substantially elongated tubular body (84) extending between the first and second ends (80) and defining a core (86) for enclosing and protecting electrical connections (such as, for example, wires, and the like) between the electrical feedthrough pin (56) and the electronics PCB (52). In some embodiments, the high voltage insulator (22) comprises an electrically insulating material. As used herein, the term "electrically insulating" refers to a material that responds with high resistance to the flow of electrical current or totally resists electrical current. Electrically insulating materials include, but are not limited to, polyethylene, cross-linked polyethylene, polyvinyl chloride, silicone, rubber, and the like.

Figure 8:
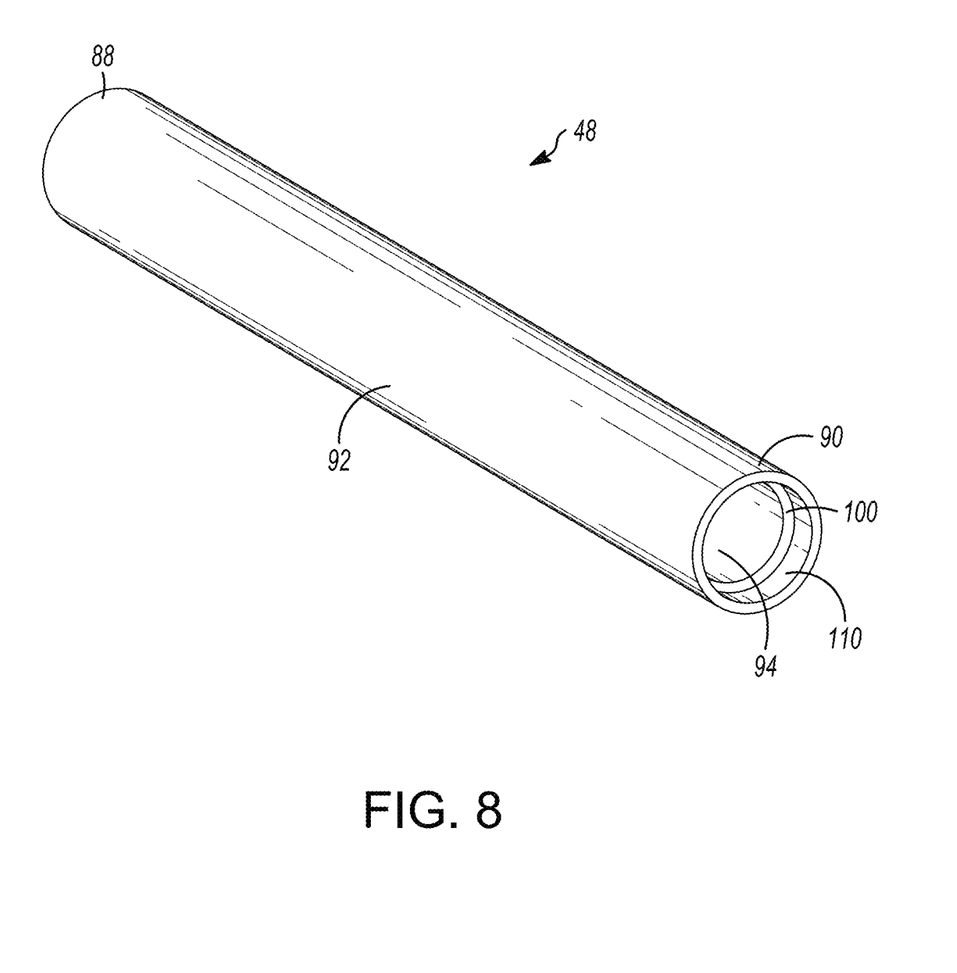
FIG. 8 is a perspective view of one embodiment of a housing of the integrated ESP sensor device of FIG. 2A.

Referring to FIGS. 2B-C and 8, the electronics assembly (12) generally comprises a housing (48) and the electronics PCB (52) housed therein. In some embodiments, the housing (48) comprises a first end (88), a second end (90), and a substantially tubular body (92) extending between the first and second ends (88, 90) and defining an internal cavity (94) for housing the electronics PCB (52). In some embodiments, the first end (88) of the housing (48) is formed with a first internal circumferential seat (96) for receiving the integrated temperature sensor and electrical feedthrough assembly (10) (FIG. 2C). In some embodiments, the first end (88) of the housing (48) comprises internal threads (not shown) for engaging corresponding second external threads (36) of the probe body (16) to removably attach the probe body (16) to the housing (48). In some embodiments, welds or adhesives (such as, for example, glue) can be substituted for threads.

In some embodiments, the second end (90) of the housing (48) is formed with a second internal circumferential seat (100) for receiving the pressure assembly (14) (FIG. 2B). In some embodiments, the second end (90) of the housing (48) comprises internal threads (not shown) for engaging corresponding external threads (not shown) of a bulkhead (114) to removably attach the bulkhead (114) to the housing (48). In some embodiments, welds or adhesives (such as, for example, glue) can be substituted for threads. In some embodiments, the first and second ends (88, 90) are configured identically, allowing the probe body (16) and bulkhead (114) to be attached at either end (88, 90) of the housing (48) during assembly.

The electronics PCB (52) comprises a laminated sandwich structure of conductive and insulating layers. In some embodiments, the electronics PCB (52) is formed of laminate materials including, but not limited to, fiberglass and composite epoxy. In some embodiments, the electronics PCB (52) is substantially rectangular-shaped. The electronics PCB (52) provides conductive pathways etched onto its surface for affixing various electronic components (not shown) in specific positions, and electrical connections between the electronic components.

In some embodiments, the electronics PCB (52) is in electrical communication with various sensors which generate electrical signals representative of parameters including, but not limited to, motor oil temperature, formation temperature, pressure, vibration, acceleration, position, voltage, etc., and transmit the electrical signals to the electronics PCB (52). In some embodiments, the electronics PCB (52) is electrically connected to the sensors using suitable connection means including, but not limited to, wires. The electronics PCB (52) processes the electrical signals from the sensors and transmits data representative of the electrical signals via a communications link to a data acquisition, processing, or control system on the surface. In some embodiments, the communications link comprises the electrical feedthrough pin (56). In some embodiments, transmission of the data is conducted using digital current or voltage modulation. The electronics PCB (52) is electrically connected to a suitable power source to receive power for operation. Suitable power sources include, but are not limited to, the electrical feedthrough pin (56). The PCB (52) is encapsulated within the housing (48) to prevent damage to the electronic components by protecting them from contact with the external environment.

Figure 9A:
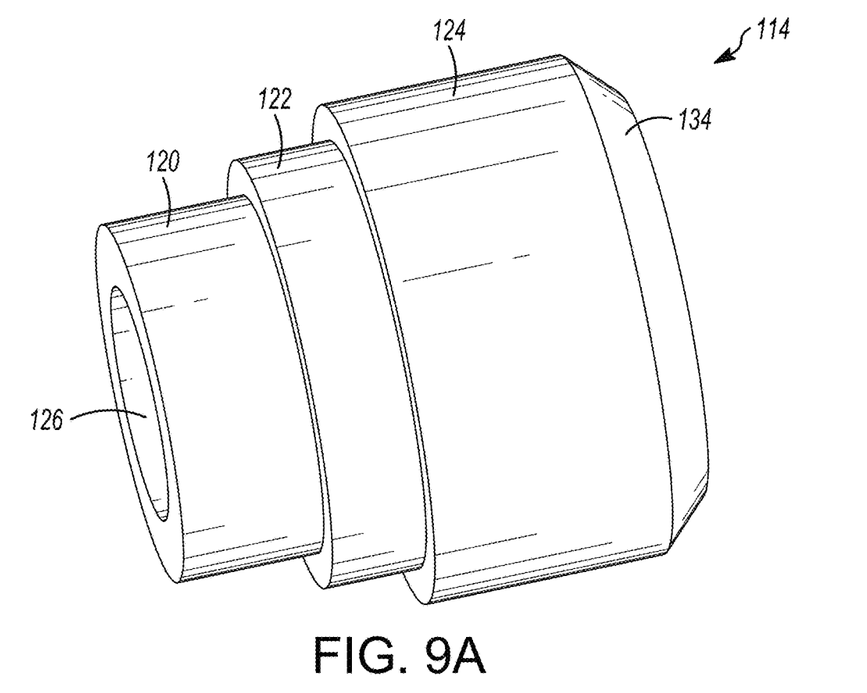
FIG. 9A is a perspective view of one embodiment of a bulkhead of the integrated ESP sensor device of FIG. 2A.
Figure 9B:
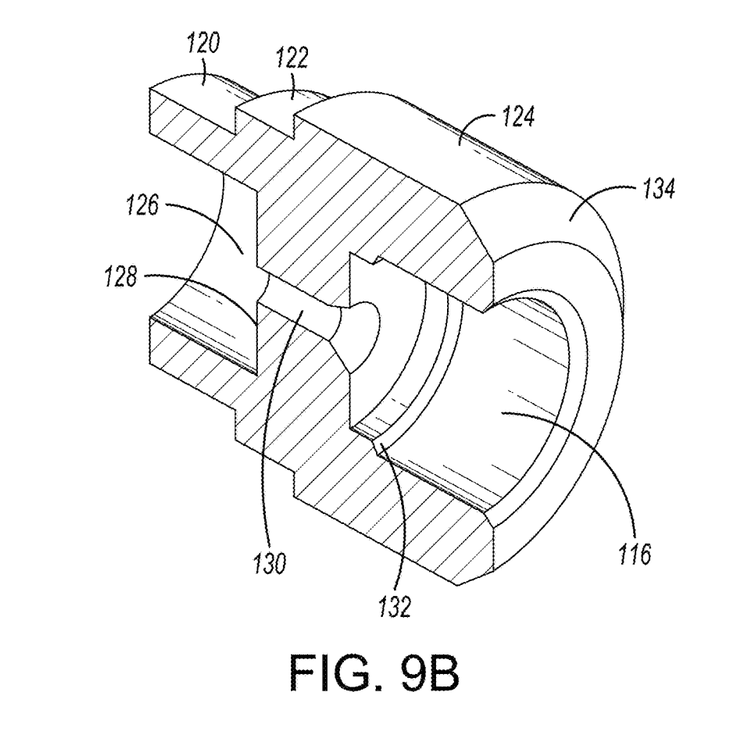
FIG. 9B is a cross-sectional view of one embodiment of a bulkhead of the integrated ESP sensor device of FIG. 2A.
Figure 9C:
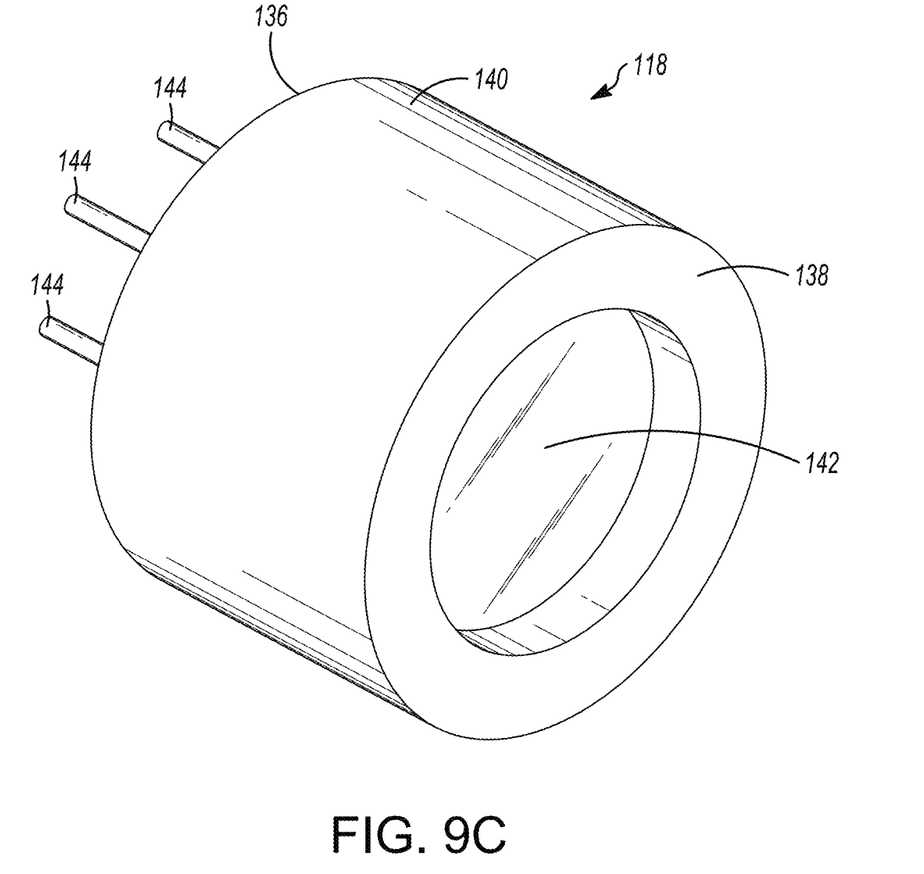
FIG. 9C is a perspective view of one embodiment of a pressure sensor of the integrated ESP sensor device of FIG. 2A.

Referring to FIGS. 9A-C, the pressure assembly (14) generally comprises the bulkhead (114), a pressure port (116), and a pressure sensor (118). In some embodiments, the bulkhead (114) is substantially tubular and comprises a first portion (120), a second portion (122), and a third portion (124) which are configured as one piece to together define a unitary bore (126) extending therethrough. In some embodiments, the first portion (120) has an external diameter smaller than the external diameter of the second portion (122), and the second portion (122) has an external diameter smaller than the external diameter of the third portion (124), with the third portion (124) having the largest external diameter.

In some embodiments, the first portion (120) is configured to receive and accommodate the pressure sensor (118). In some embodiments, the first portion (120) defines a seat (128) for receiving the pressure sensor (118). In some embodiments, the second and third portions (122, 124) together define a narrow passage (130) which extends through the second portion (122) and partially through the third portion (124). In some embodiments, the third portion (124) is configured to receive and accommodate the pressure port (116). In some embodiments, the third portion (124) is formed with an internal circumferential seat (132) for receiving and seating the pressure port (116). In some embodiments, the third portion (124) is formed with a sloped outer edge (134).

In some embodiments, the pressure port (116) is positioned to extend through the narrow passage (132) and the third portion (124). In some embodiments, the pressure port (116) generally comprises a piping connection configured to expose the pressure sensor (118) to the external pressure source in the wellbore adjacent to the device (1), thereby allowing the pressure sensor (118) to sense the external pressure. The external pressure source may be the pressure of fluids within the wellbore adjacent to the device (1). In some embodiments, the piping connection comprises a threaded port.

In some embodiments, the pressure sensor (118) is positioned within the first portion (120). In some embodiments, the pressure sensor (118) rests against the seat (128) of the first portion (120). In some embodiments, the pressure sensor (118) comprises a front end (136), a back end (138), and a generally tubular body (140) extending between the front and back ends (136, 138). The pressure sensor (118) senses external pressure applied to the back end (138) through the pressure port (116). In some embodiments, a flexible membrane or diaphragm (142) is positioned at the back end (138) and deflects to an extent proportional to the magnitude of the pressure applied. Depending on the type of pressure sensor (118), the deflection may generate a change in resistance, capacitance, charge, and the like. The resulting deflection is translated into an electrical signal. In some embodiments, one or more electrical terminals (144) protrude outwardly from the front end (136) and are electrically connected to the electronics PCB (52) to transmit the electrical signal from the pressure sensor (118) to the electronics PCB (52). In some embodiments, the electrical terminals (144) are connected to the electronics PCB (52) using wires. In some embodiments, the pressure sensor (118) produces an electrical signal in the form of an output voltage or output current.

In some embodiments, other types of sensors may be integrated into the device (1) and connected to the electronics PCB (52) to transmit electrical signals representative of various other parameters internal and external to the ESP system including, but not limited to, vibration (e.g., vibration XYZ and axial; vibration spectrum data by frequency), formation temperature, internal PCB temperature, acceleration (e.g., acceleration XYZ and axial), position (e.g., tilt angle), relative bearing, voltage (e.g., diagnostic voltages such as power supply), flow, water cut, torque, RPM, fluid density or salinity, flow rate, acoustic noise, and the like. In some embodiments, additional sensors are positioned within the housing (48). In some embodiments, the additional sensor comprises a vibration sensor (not shown) to sense vibration. In some embodiments, the additional sensor comprises a formation temperature sensor (not shown) to sense the temperature of the formation. The vibration and formation temperature sensors generate and transmit electrical signals to the electronics PCB (52) for processing and transmission to surface equipment.

Figure 10A:
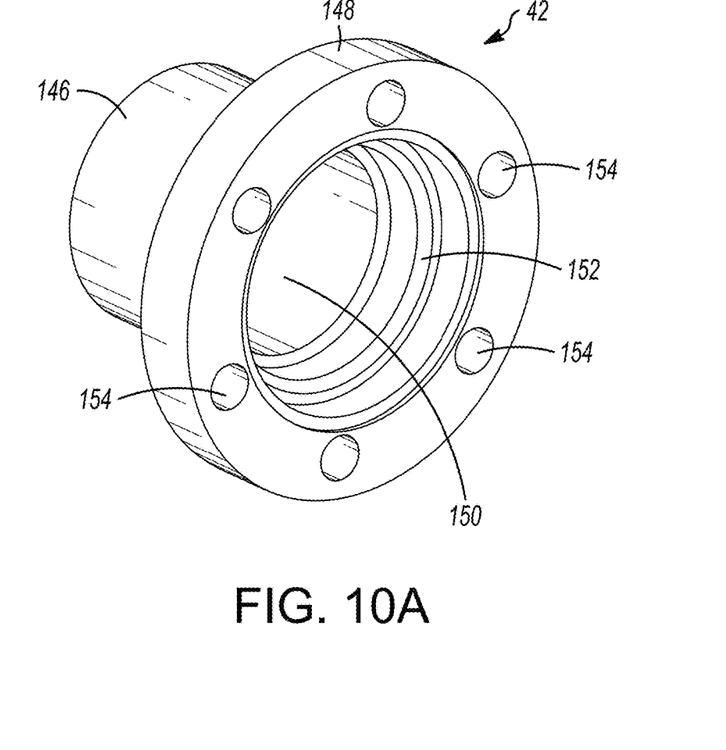
FIG. 10A is a perspective view of one embodiment of a flange adapter.
Figure 10B:
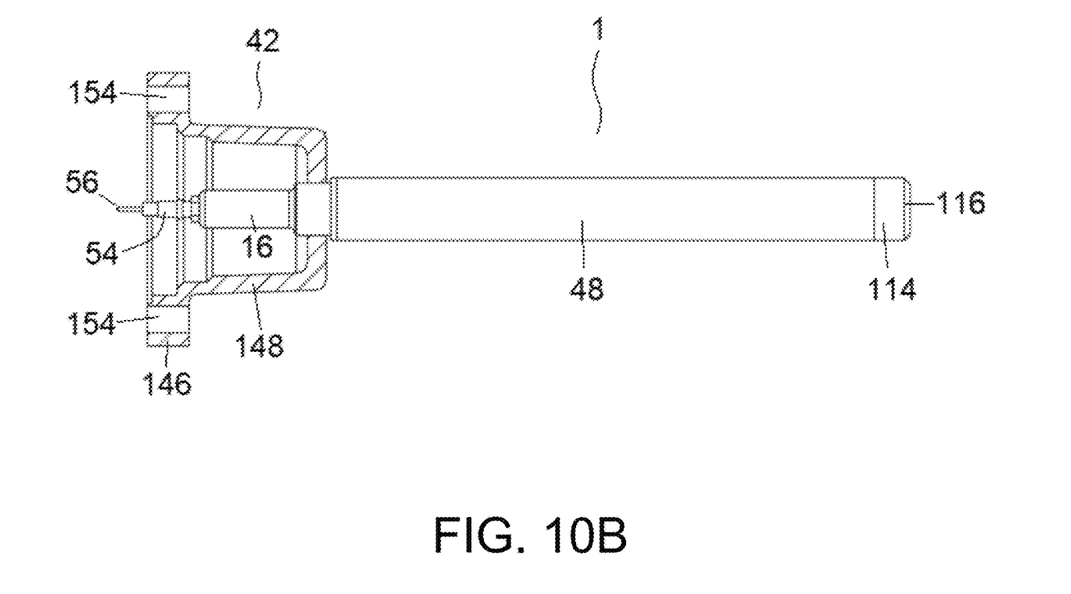
FIG. 10B is a cross-sectional view of the flange adapter of FIG. 10A, showing attachment of the integrated ESP sensor device of FIG. 2A.

During assembly, the device (1) is mounted onto the base of the motor which is a component of the ESP string. In some embodiments, the device (1) is removably attached to the flange adapter (42) which is then bolted to the base of the motor. Referring to FIGS. 10A-B, in some embodiments, the flange adapter (42) comprises a tubular portion (146) and a disk portion (148) which are constructed as one integral piece and define an inner chamber (150) for receiving and accommodating the device (1). In some embodiments, the inner chamber (150) defines internal threads (152) corresponding to the first external threads (34) of the probe body (16) for removably attaching the device (1) to the flange adapter (42). The device (1) is centered within the inner chamber (150), with the probe body (16) positioned inside the inner chamber (150), and the housing (48) and bulkhead (114) positioned outside the disk portion (148). When properly positioned, the first end (88) of the housing (48) abuts the disk portion (148) of the flange adapter (42).

Figure 11:
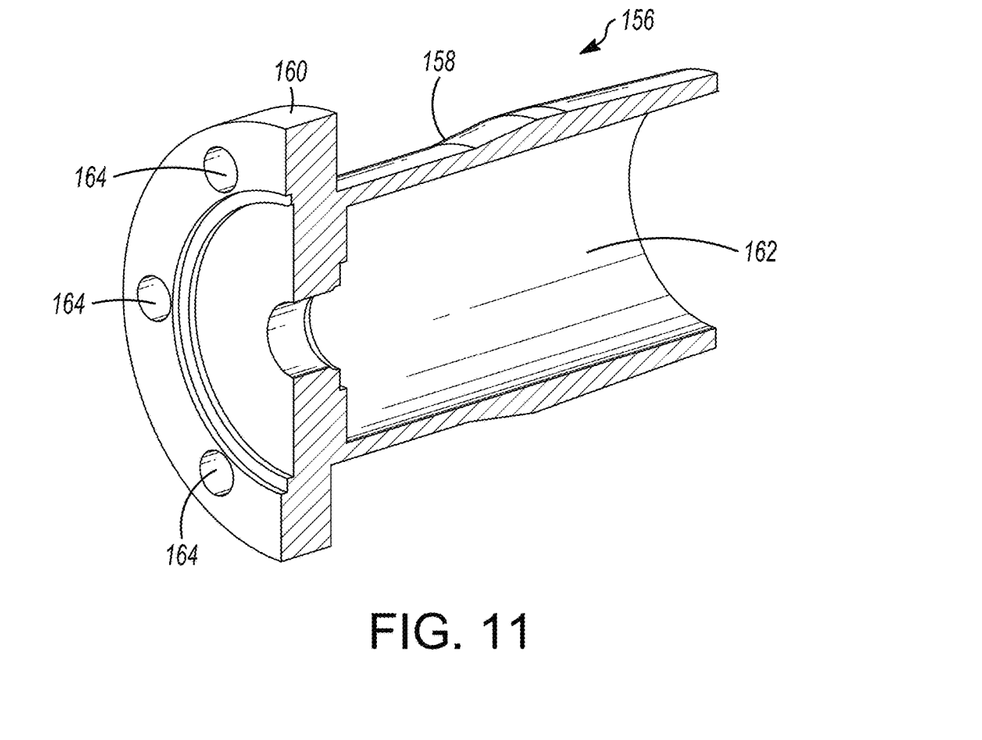
FIG. 11 is a cross-sectional view of one embodiment of a pipe adapter.

In some embodiments, the device (1) is removably attached to a pipe adapter (156) which is then bolted to the base of the motor. Referring to FIG. 11, in some embodiments, the pipe adapter (156) comprises a tubular portion (158) and a disk portion (160) which are constructed as one integral piece and define an inner chamber (162) for receiving and accommodating the device (1). In some embodiments, the inner chamber (162) defines internal threads (not shown) corresponding to the first external threads (34) of the probe body (16) for removably attaching the device (1) to the pipe adapter (156). The device (1) is centered within the inner chamber (162), with the probe body (16) positioned inside the inner chamber (162), and the housing (48) and bulkhead (114) positioned outside the disk portion (160).

The device (1) is thus easy and quick to install and remains stationary and stable during use. In some embodiments, the device (1) can be readily screwed into any threaded opening. In some embodiments, the device (1) may be attached directly to the pump. In some embodiments, the device (1) can be attached to the flange adapter (42) or pipe adapter (156) by being welded, integrally machined, or bonded to the flange adapter (42), pipe adapter (156), or directly to the pump. This is a notably substantial improvement in comparison to conventional downhole gauges, which require extra connections and laborious, time-consuming assembly.

The disk portion (148, 160) of the flange adapter (42) or pipe adapter (156) has a plurality of apertures (154, 164) through which connecting bolts (not shown) are inserted. The bolts compress the flange adapter (42) or the pipe adapter (156) to the base of the motor when the bolts engage corresponding nuts in a threaded manner. The spacing of the apertures (154, 164) on the disk portion (148, 160) is radially equidistant from each other to maximize the application of compressive forces. The apertures (154, 164) are also positioned equidistantly from the circumference edge of the disk portion (148, 160).

Figure 12:
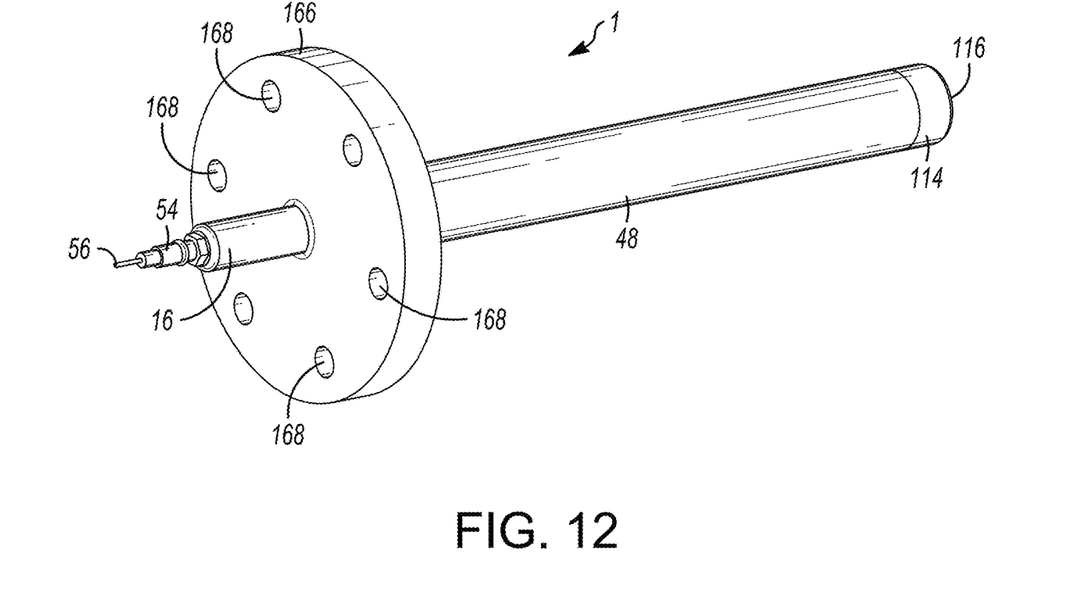
FIG. 12 is a perspective view of one embodiment of the integrated ESP sensor device of FIG. 2A including an integral flange connection.

Referring to FIG. 12, in some embodiments, the device (1) comprises an integral flange connection (166) having a plurality of apertures (168) through which connecting bolts (not shown) are inserted. The bolts compress the flange connection (166) to the base of the motor when the bolts engage corresponding nuts in a threaded manner. The spacing of the apertures (168) on the flange connection (166) is radially equidistant from each other to maximize the application of compressive forces. The apertures (168) are also positioned equidistantly from the circumference edge of the flange connection (166).

Figure 13A:
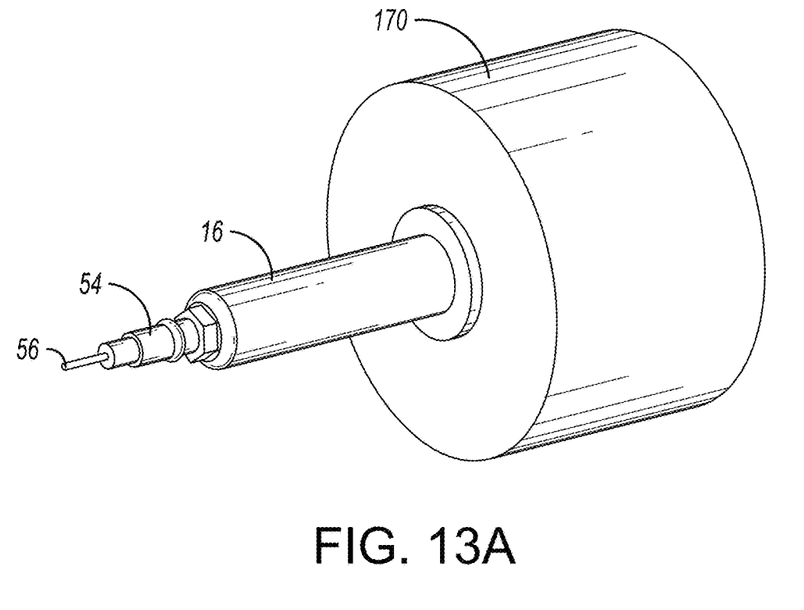
FIG. 13A is a perspective view of one embodiment of an integrated ESP sensor device of the present invention.
Figure 13B:
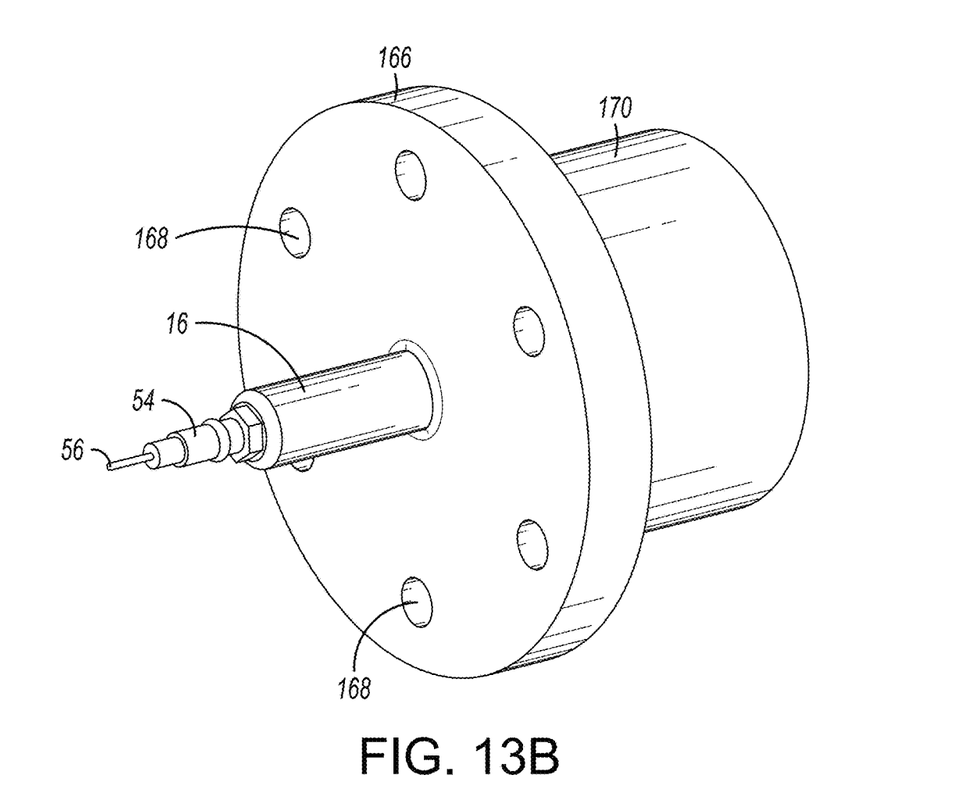
FIG. 13B is a perspective view of one embodiment of the integrated ESP sensor device of FIG. 13A including an integral flange connection.

FIGS. 13A-B show one embodiment of the device (1) comprising a modified puck-shaped housing (170) for encapsulating the PCB (52). The puck-shaped housing (170) is configured to seat within any adapter connected to the motor. In some embodiments, the puck-shaped housing (170) may be welded, pressed into position, sealed with suitable sealing means including, but not limited to, O-rings, or threaded into a pressure fitting. By decreasing the length of the housing for the PCB (52), the device (1) may be made further compact.

In some embodiments, the device (1) of FIG. 13A may comprise an integral flange connection (166) having a plurality of apertures (168) through which connecting bolts (not shown) are inserted (FIG. 13B). The bolts compress the flange connection (166) to the base of the motor when the bolts engage corresponding nuts in a threaded manner. The spacing of the apertures (168) on the flange connection (166) is radially equidistant from each other to maximize the application of compressive forces. The apertures (168) are also positioned equidistantly from the circumference edge of the flange connection (166).

The various components of the device (1) can be constructed from any material or combination of materials having suitable properties such as, for example, mechanical strength, ability to withstand cold, heat, and adverse downhole conditions, corrosion resistance, and ease of machining. In some embodiments, the probe body (16), housing (48), bulkhead (114), flange adapter (42), pipe adapter (156), electrical feedthrough pin (56), and attachment means (e.g., hex nut, bolts, threads) may be formed for example, of metal including, but not limited to, stainless steel, carbon-steel, and strength-bearing materials. In some embodiments, the electrical feedthrough body (54) may be formed partially of insulation material. O-rings (66) may be formed of different deformable, resilient materials (for example, nitrile rubber) having varying durometers and compatible with oil and gases. Since the device (1) operates in high pressure, all joints include sealing means including, but not limited to, O-ring seals, welds, adhesive such as glues, and the like.

Once the device (1) is installed, power is provided to the electronics PCB (52), and the sensors (18, 118) are operating, the technician can monitor multiple parameters indicative of the health of the ESP system. Observation of the readings from the sensors (18, 118) of the device (1) will alert the technician of any problems requiring intervention and facilitate troubleshooting of ESP failures downhole. Monitoring anomalies in pressure, temperature or vibration data can indicate possible damage or impending failure. Real-time data allows for enhanced monitoring and protection of downhole equipment.

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or integrated with other elements, components, or steps that are not expressly referenced. Accordingly, various changes and modifications can be made to the exemplary embodiments and uses without departing from the scope of the invention as defined in the claims that follow.

What is claimed is:

1. A device for monitoring an electrical submersible pump having a motor comprising:
   an integrated temperature sensor and electrical feedthrough assembly comprising a probe body housing the temperature sensor, the electrical feedthrough assembly, and a high voltage insulator, thereby providing a single high voltage connector to the motor of the pump, and wherein the temperature sensor is positioned within the single high voltage connector;
   an electronics assembly operably connected to the integrated temperature sensor and the electrical feedthrough assembly; and
   a pressure assembly operably connected to the electronics assembly.

2. The device of claim 1, being threadably attachable to the motor using a flange adapter, a pipe adapter, or an integral flange connection, or directly to the pump.

3. The device of claim 2, wherein the temperature sensor comprises a motor oil temperature sensor for sensing motor oil temperature of the motor, the motor oil temperature being indicative of motor temperature.

4. The device of claim 3, wherein the temperature sensor is selected from a thermocouple, a resistive temperature device, a resonant temperature sensor, or a solid state temperature sensor.

5. The device of claim 3, wherein the temperature sensor is positioned proximal to the electrical feedthrough assembly and exterior of the high voltage insulator within the probe body.

6. The device of claim 5, wherein the temperature sensor is positioned substantially parallel and above the high voltage insulator within the probe body.

7. The device of claim 3, wherein the temperature sensor is electrically connected to the electronics assembly for transmitting an electrical signal representative of the motor oil temperature to the electronics assembly.

8. The device of claim 1, wherein the electrical feedthrough assembly comprises an electrical feedthrough body and an electrical feedthrough pin, the electrical feedthrough body comprising components aligned along an axis to define a unitary passageway for the electrical feedthrough pin to extend therethrough.

9. The device of claim 8, wherein the electrical feedthrough pin is configured to receive power from the motor for transmission to the electronics assembly, and to receive electrical signals from the electronics assembly for transmission to surface equipment.

10. The device of claim 8, wherein the high voltage insulator, the electronics assembly, and the pressure assembly are positioned in alignment with the axis.

11. The device of claim 8, wherein the high voltage insulator defines a core for enclosing electrical connections between the electrical feedthrough pin and the electronics assembly.

12. The device of claim 1, wherein the pressure assembly comprises a bulkhead housing a pressure sensor for sensing pressure and a pressure port for exposing the pressure sensor to an external pressure source, wherein the pressure sensor generates electrical signals representative of pressure for transmission to the electronics assembly.

13. The device of claim 12, wherein the electronics assembly comprises a housing encapsulating an electronics printed circuit board for receiving and processing the electrical signals from the temperature sensor and the pressure sensor for transmission to surface equipment via the electrical feedthrough assembly.

14. The device of claim 13, wherein a first end of the housing defines a first internal circumferential seat for receiving the integrated temperature sensor and electrical feedthrough assembly.

15. The device of claim 14, wherein a second end of the housing defines a second internal circumferential seat for receiving the pressure assembly.

16. The device of claim 13, wherein the housing encapsulating the electronics printed circuit board is puck-shaped.

17. The device of claim 1, further comprising one or more sensors selected from a vibration sensor or a formation pressure sensor.

18. The device of claim 2, wherein the probe body is substantially tubular and comprises a first section and a second section defining a unitary bore extending therethrough, the first section defining an internal seat against which the electrical feedthrough assembly abuts.

19. The device of claim 18, wherein the second section comprises first external threads, second external threads, and an external circumferential collar disposed therebetween, the first external threads engaging corresponding internal threads of a flange adapter.

20. A device for monitoring an electrical submersible pump having a motor and being threadably attachable to the motor using a flange adapter, a pipe adapter, or an integral flange connection, or directly to the pump, the device comprising:
- an integrated temperature sensor and electrical feedthrough assembly comprising a substantially tubular probe body comprising a first section and a second section defining a unitary bore extending therethrough for housing the temperature sensor, the electrical feedthrough assembly, and a high voltage insulator,
  - the first section defining an internal seat against which the electrical feedthrough assembly abuts; and
  - the second section comprising first external threads, second external threads, and an external circumferential collar disposed therebetween, the first external threads engaging corresponding internal threads of the flange adapter, the pipe adapter, or the integral flange connection, or directly to the pump,
- an electronics assembly operably connected to the integrated temperature sensor and the electrical feedthrough assembly; and
- a pressure assembly operably connected to the electronics assembly.

* * * * *